US008817008B2

(12) United States Patent
Park et al.

(10) Patent No.: US 8,817,008 B2

(45) Date of Patent: Aug. 26, 2014

(54) PIXEL AND ORGANIC LIGHT EMITTING DISPLAY DEVICE USING THE SAME

(75) Inventors: Yong-Sung Park, Yongin (KR); Bo-Yong Chung, Yongin (KR); Deok-Young Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 895 days.

(21) Appl. No.: 12/887,430

(22) Filed: Sep. 21, 2010

(65) Prior Publication Data

US 2011/0157144 A1 Jun. 30, 2011

(30) Foreign Application Priority Data

Dec. 30, 2009 (KR) ........................ 10-2009-0134001

(51) Int. Cl.

*G06F 3/038* (2013.01)

*G09G 3/30* (2006.01)

(52) U.S. Cl.

USPC ................................ 345/212; 345/76; 345/78

(58) Field of Classification Search

USPC .............................. 345/76, 212, 78, 204, 211

See application file for complete search history.

(56) References Cited

U.S. PATENT DOCUMENTS

| | | | | |
|---|---|---|---|---|
| 2009/0201231 | A1 * | 8/2009 | Takahara et al. | 345/76 |
| 2009/0243977 | A1 * | 10/2009 | Chung | 345/76 |

FOREIGN PATENT DOCUMENTS

| | | | |
|---|---|---|---|
| KR | 10-2005-0052033 | A | 6/2005 |
| KR | 10-2007-0002155 | A | 1/2007 |
| KR | 10-2008-0022696 | | 3/2008 |
| KR | 10-2008-0022696 | A | 3/2008 |
| KR | 10-2009-0003894 | | 1/2009 |
| KR | 10-2009-0003894 | A | 1/2009 |

OTHER PUBLICATIONS

KIPO Office Action dated May 17, 2011 for KR Application No. 10-2009-0134001 (1 page).

* cited by examiner

*Primary Examiner* — Kent Chang

*Assistant Examiner* — Kuo Woo

(74) *Attorney, Agent, or Firm* — Christie, Parker & Hale, LLP

(57) ABSTRACT

A pixel of a display with reduced leakage current is disclosed. The pixel includes: an organic light emitting diode; a first transistor for controlling an amount of current flowing from a first power source to a second power source via the organic light emitting diode; a storage capacitor coupled between the first power source and a gate electrode of the first transistor; a plurality of third transistors coupled between the gate electrode and a second electrode of the first transistor; and a plurality of fourth transistors coupled between the gate electrode of the first transistor and an initialization power source. The third and fourth transistors are configured to reduce a leakage current from the storage capacitor to improve the image quality of the display.

16 Claims, 7 Drawing Sheets

PIXEL AND ORGANIC LIGHT EMITTING DISPLAY DEVICE USING THE SAME

CROSS-REFERENCE TO RELATED APPLICATION

This application claims priority to and the benefit of Korean Patent Application No. 10-2009-0134001, filed on Dec. 30, 2009, in the Korean Intellectual Property Office, the entire content of which is incorporated herein by reference.

BACKGROUND

1. Field

An aspect of embodiments of the present invention relates to a pixel and an organic light emitting display device using the same.

2. Description of Related Art

Flat panel display devices with reduced weight and volume in comparison to a cathode ray tube have been developed. The flat panel display devices include a liquid crystal display (LCD), a field emission display (FED), a plasma display panel (PDP), and an organic light emitting display.

The organic light emitting display displays an image by using organic light emitting diodes which emit light when electrons and holes are re-combined, and has a rapid response and a low power consumption.

The organic light emitting display device includes a plurality of pixel arranged at crossings between a plurality of data lines, a plurality of scan lines, and power lines in a matrix form. Each of the pixels includes an organic light emitting diode, a driving transistor for controlling a current flowing through the organic light emitting diode, a storage capacitor for storing a voltage corresponding to a data signal, and a compensation circuit for compensating a threshold voltage of the driving transistor.

The pixel stores a voltage corresponding to the threshold voltage and the data signal of the driving transistor to the storage capacitor and supplies a current corresponding to the stored voltage to the organic light emitting diode to display an image.

In order to display an image at a desired gray level, voltages respectively charged at the storage capacitors of the pixels must be kept uniform. Therefore, four or more transistors are connected to a current leakage path to prevent a voltage of the storage capacitor from being changed.

For example, in the case where a first transistor is formed on a first current leakage path connected to the storage capacitor and a second transistor is formed on a second current leakage path, each of the first transistor and the second transistor is formed by connecting at least four transistors in series. However, although the at least four transistors are connected on the current leakage path as described above, a leakage current of a certain amount is generated so that an image of a desired brightness or gray level cannot be displayed. In addition, according to the conventional art, a storage capacitor is formed to have a large capacity in order to cope with the leakage current, and therefore, aperture ratio of the display device is lowered.

SUMMARY

Accordingly, embodiments of the present invention are directed toward a pixel capable of minimizing or reducing a leakage current for displaying an image of a desired brightness or gray level and an organic light emitting display device using the same.

According to one embodiment of the present invention, there is provided a pixel including: an organic light emitting diode, a cathode electrode of the organic light emitting diode being coupled to a second power source; a first transistor for controlling an amount of current flowing from a first power source to the second power source via the organic light emitting diode; a second transistor coupled between a data line and a first electrode of the first transistor, the second transistor configured to turn on when a scan signal is supplied to an i-th (i is a natural number) scan line; a storage capacitor coupled between the first power source and a gate electrode of the first transistor; a plurality of third transistors coupled between the gate electrode and a second electrode of the first transistor, the third transistors configured to turn on when the scan signal is supplied to the i-th scan line; a plurality of fourth transistors coupled between the gate electrode of the first transistor and an initialization power source, the fourth transistors configured to turn on when the scan signal is supplied to an (i-1)th scan line; and a leakage current prevention unit for supplying a reference voltage to a first common terminal between the third transistors and to a second common terminal between the fourth transistors.

The leakage current prevention unit may be configured to supply the reference voltage for a period when the third transistors and the fourth transistors are turned on. The leakage current prevention unit may include at least one transistor for supplying the reference voltage to the first common terminal and the second common terminal.

According to one embodiment of the present invention, there is provided a pixel including: an organic light emitting diode; a driving transistor for controlling an amount of current flowing to the organic light emitting diode; a storage capacitor coupled to a gate electrode of the driving transistor; a plurality of leakage transistors in which at least two leakage transistors are coupled in series between the gate electrode of the driving transistor and a first voltage source; and a leakage current prevention unit for supplying a voltage of a second voltage source different from that of the first voltage source to a common terminal between the at least two leakage transistors.

The first voltage source may include one of a second power source coupled to a cathode electrode of the organic light emitting diode or an initialization power source for initiating a voltage of a gate electrode of the driving transistor. The second voltage source may be configured to supply a voltage higher than that of the first voltage source.

According to one embodiment of the present invention, there is provided an organic light emitting display device including: a scan driving unit for supplying a scan signal to scan lines and for supplying a light emitting control signal to light emitting control lines; a data driving unit for supplying a data signal to data lines; a plurality of pixels positioned at intersections between the scan lines and the data lines, a pixel of the pixels positioned at an i-th (i is a natural number) horizontal line. The pixel includes: an organic light emitting diode, a cathode electrode of the organic light emitting diode being coupled to a second power source; a first transistor for controlling an amount of current flowing from a first power source to the second power source via the organic light emitting diode; a second transistor coupled between a data line of the data lines and a first electrode of the first transistor, the second transistor configured to turn on when the scan signal is supplied to an i-th scan line; a storage capacitor coupled between the first power source and a gate electrode of the first transistor; a plurality of third transistors coupled between the gate electrode and a second electrode of the first transistor, the third transistors configured to turn on when the scan signal is supplied to the i-th scan line; a plurality of fourth transistors coupled between the gate electrode of the first transistor and an initialization power source, the fourth transistors configured to turn on when the scan signal is supplied to an (i-1)th scan line; and a leakage current prevention unit for supplying a reference voltage to a first common terminal between the third transistors and to a second common terminal between the fourth transistors.

The leakage current prevention unit may be configured to supply the reference voltage during a period excluding a period when the light emitting control signal is supplied to an i-th light emitting control line. The scan driving unit may be configured to supply the light emitting control signal to the i-th light emitting control line to be overlapped with scan signals supplied to the (i-1)th scan line and the i-th scan line, respectively. The leakage current prevention unit may include at least one transistor for supplying the reference voltage to the first common terminal and the second common terminal.

According to the pixel and the organic light emitting display of the embodiments of the present invention, a voltage difference between a transistor and a storage capacitor which are positioned on a current leakage path may be minimized or reduced, so that a leakage current may be prevented from being generated or reduced. In addition, due to the minimized or reduced leakage current, a size of the storage capacitor may be reduced so that an aperture ration of the display can be improved. According to the embodiments of the present invention, a number of transistors are formed on a current leakage path so that an aperture ration can be enhanced.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
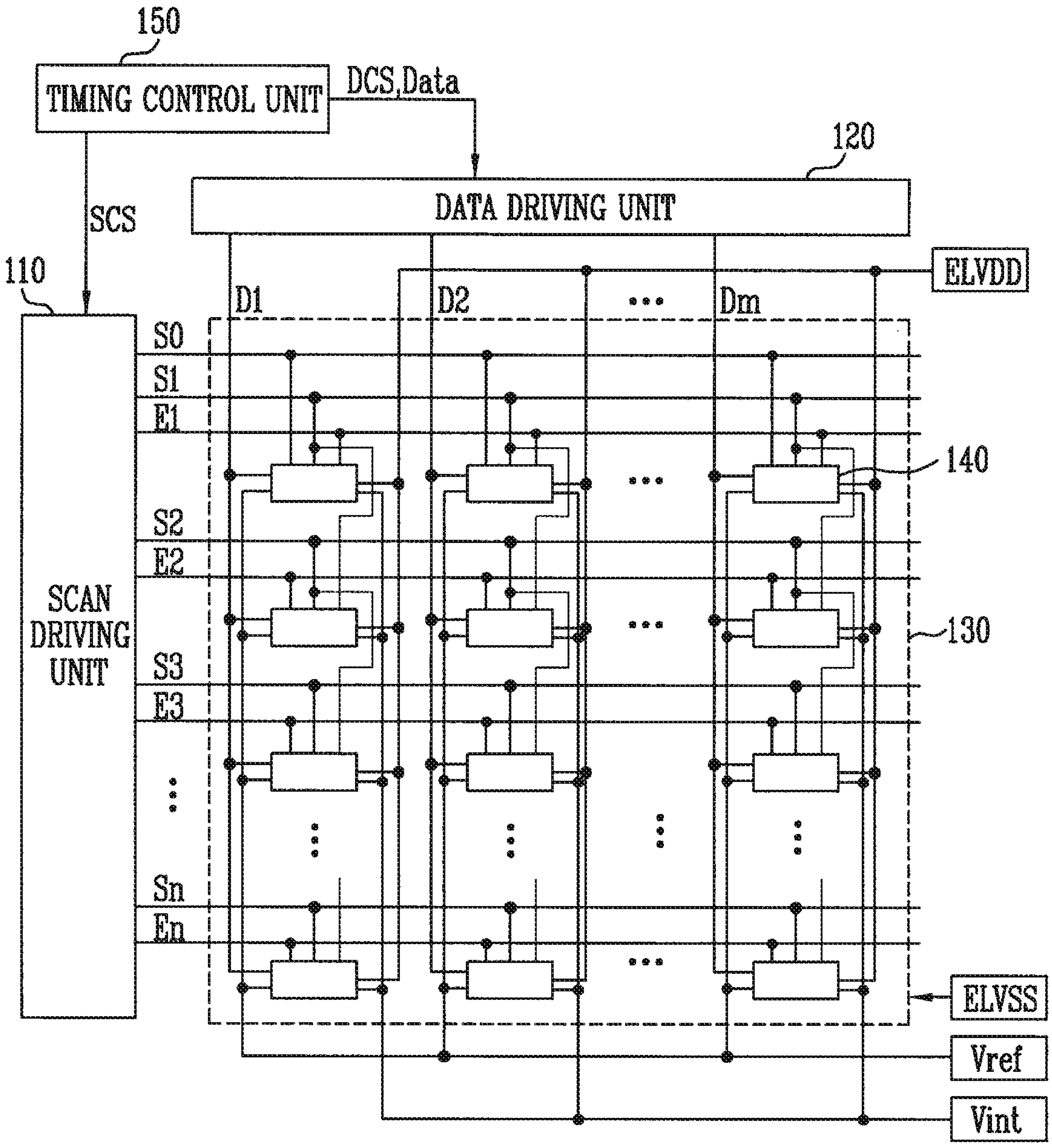
FIG. 1 is a diagram illustrating an organic light emitting display device according to an embodiment of the present invention.

Hereinafter, certain exemplary embodiments according to the present invention will be described with reference to the accompanying drawings. Here, when a first element is described as being connected to or coupled to a second element, the first element may be directly connected to or coupled to the second element or indirectly connected to or coupled to the second element via a third element. Further, some of the elements that are not essential to a complete understanding of the invention are omitted for clarity. Also, like reference numerals refer to like elements throughout.

Hereinafter, exemplary embodiments of the present invention will be described in detail with reference to FIGS. 1 to 8.

FIG. 1 is a diagram illustrating an organic light emitting display device according to an embodiment of the present invention.

Referring to FIG. 1, an organic light emitting display device according to an embodiment of the present invention includes pixels 140 positioned to be connected to scan lines S0 to Sn, light emitting controlling lines E1 to En, and data lines D1 to Dm, a scan driving unit 110 (e.g., a scan driver) for driving the scan lines S0 to Sn and the light emitting controlling lines E1 to En, a data driving unit 120 (e.g., a data driver) for driving the data lines D1 to Dm, and a timing control unit 150 (e.g., a timing controller) for controlling the scan driving unit 110 and the data driving unit 120.

The scan driving unit 110 receives a scan driving control signal SCS from the timing control unit 150. The scan driving unit 110, in response to receiving the scan driving control signal SCS, generates a scan signal and supplies the generated scan signal to the scan lines S0 to Sn sequentially. In addition, the scan driving unit 110, in response to receiving the scan driving control signal SCS, generates a light emitting control signal and supplies the generated light emitting control signal to the light emitting control lines E1 to En, sequentially. A light emitting control signal to be supplied to an i-th (i is a natural number) light emitting control line Ei is overlapped with scan signals to be supplied to an (i-1)th scan line Si-1 and an i-th scan line Si.

The data driving unit 120 receives a data driving control signal DCS from the timing control unit 150. The data driving unit 120, in response to receiving the data driving control signal DCS, supplies a data signal to the data lines D1 to Dm when the scan signal is supplied.

The timing control unit 150 generates the data driving control signal DCS and the scan driving control signal SCS in response to an externally supplied synchronization signal. The data driving control signal DCS generated by the timing control unit 150 is supplied to the data driving unit 120, and the scan driving control signal SCS is supplied to the scan driving unit 110. The timing control unit 150 supplies externally supplied data to the data driving unit 120.

A display unit 130 receives power from external power sources including a first power source ELVDD, a second power source ELVSS, a reference power source Vref, and an initialization power source Vint, and feeds the power to the respective pixels 140. Each of the pixels 140 controls an amount of current flowing from the first power source ELVDD to the second power source ELVSS via an organic light emitting diode in response to the data signal. Here, each of the pixels 140 initiates a gate electrode of a driving transistor using the initialization power source Vint and minimizes or reduces a leakage current using the reference power source Vref.

To this end, the first power source ELVDD is set to a voltage higher than the second power source ELVSS. The initialization power source Vint is set to a voltage lower than a voltage obtained by subtracting a threshold voltage of the driving transistor from the data signal, and the reference power source Vref is set to a voltage higher than the initialization power source Vint. For example, the reference power source Vref may be set to the same voltage as a data signal of a middle voltage among the data signals that may be output from the data driving unit 120. For example, when the data driving unit 120 supplies data signals of 2 V to 4 V, the reference power source Vref may be set to a voltage of 3 V.

In some embodiments, the reference power source Vref may be replaced by various voltages such as a uniform direct voltage. This will be described in association with the structure of the pixels 140 below.

Figure 2:
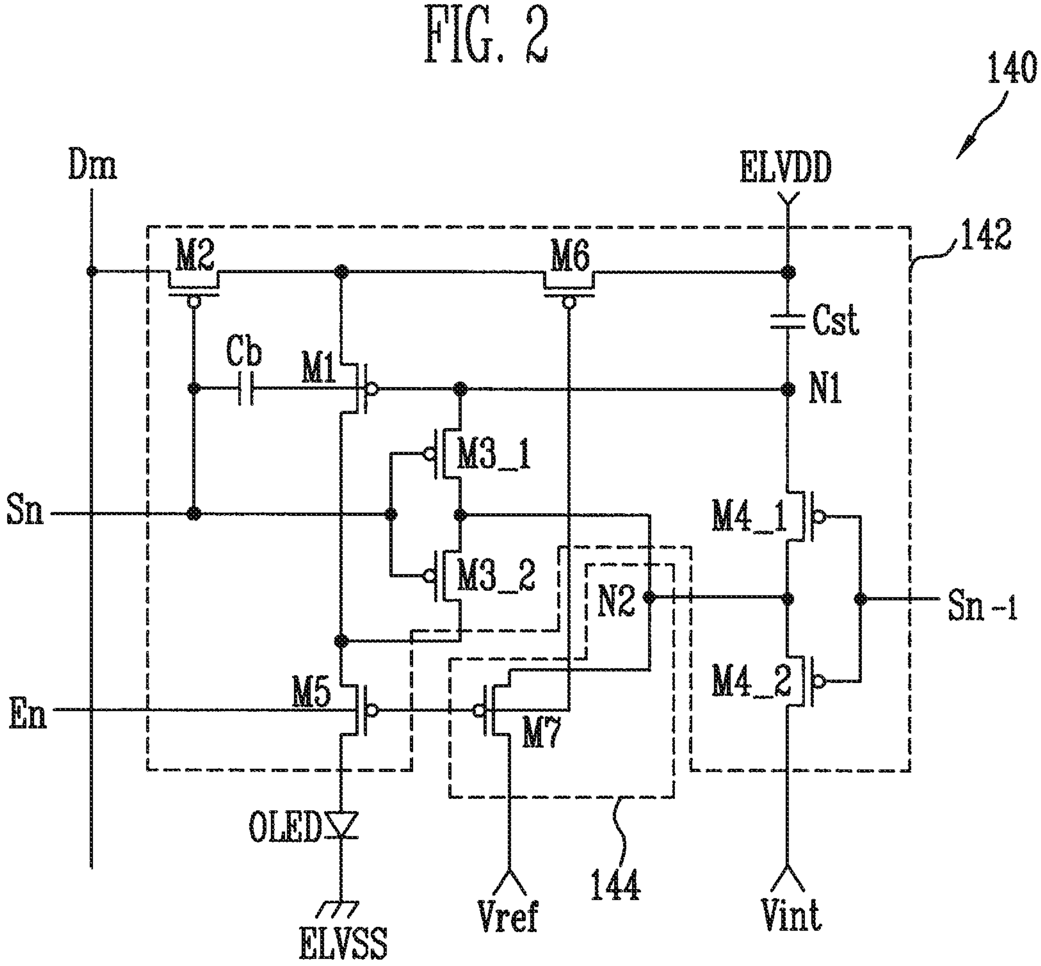
FIG. 2 is a circuit diagram illustrating a first embodiment of a pixel as shown in FIG. 1.

FIG. 2 is a circuit diagram illustrating a first embodiment of the pixel 140 as shown in FIG. 1. For convenience of description, FIG. 2 shows a pixel connected to an (n-1)th scan line Sn-1, an n-th scan line Sn, and an m-th data line Dm.

Referring to FIG. 2, the pixel 140 according to an embodiment of the present invention includes a pixel circuit 142, which is connected to an organic light emitting diode (OLED), the data line Dm, the scan lines Sn-1 and Sn, and the light emitting control line En, for controlling an amount of current supplied to the OLED, and a leakage current prevention unit 144 electrically connected to a transistor formed on a current leakage path of the pixel circuit 142.

An anode electrode of the OLED is connected to the pixel circuit 142, and a cathode electrode of the OLED is connected to the second power source ELVSS. As such, the OLED generates light with a corresponding brightness in response to a current supplied from the pixel circuit 142.

The pixel circuit 142 stores a voltage corresponding to the data signal supplied from the data line Dm and supplies a current corresponding to the stored voltage to the OLED when the scan signal is supplied to the scan line Sn. To this end, the pixel circuit 142 includes a first transistor M1, a second transistor M2, third transistors M3_1 and M3_2, fourth transistors M4_1 and M4_2, a fifth transistor M5, and a sixth transistor M6, a storage capacitor Cst, and a boosting capacitor Cb.

As to the first transistor M1, a first electrode is connected to the first power source ELVDD via the sixth transistor M6 and a second electrode is connected to the OLED via the fifth transistor M5. A gate electrode of the first transistor M1 is connected to a first node N1. As described above, the first transistor M1 supplies a current corresponding to the voltage stored at the storage capacitor Cst, which is the voltage applied to the first node N1, to the OLED.

Here, the first electrode is a drain electrode or a source electrode, and the second electrode is different from the first electrode. For example, when the first electrode is the source electrode, the second electrode is the drain electrode.

Third transistors (or leakage transistors) M3_1 and M3_2 are connected between the first node N1 and the second electrode of the first transistor M1 in series. Here, the third transistors M3_1 and M3_2 are positioned on a current leakage path extending from the first node N1 to the second power source ELVSS via the OLED, so that at least two transistors are connected in series. The third transistors M31 and M3_2 are turned on when the scan signal is supplied to the n-th scan line Sn and connect the first transistor M1 in the form of a diode. On the other hand, a common terminal of the third transistors M3_1 and M3_2 is connected to the second node N2, which is connected to the leakage current prevention unit 144.

As to the second transistor M2, a first electrode is connected to the data line Dm, and a second electrode is connected to the first electrode of the first transistor M1. A gate of the second transistor M2 is connected to the n-th scan line Sn. As described above, the second transistor M2 is turned on when the scan signal is supplied to the n-th scan line Sn and supplies the data signal supplied through the data line Dm to the first electrode of the first transistor M1.

As to the sixth transistor M6, a first electrode is connected to the first power source ELVDD, and a second electrode is connected to the first electrode of the first transistor M1. A gate electrode of the sixth transistor M6 is connected to the light emitting control line En. As such, the sixth transistor M6 is turned on when the light emitting control signal is not supplied (i.e., when a low level voltage is supplied) and electrically connects the first power source ELVDD to the first transistor M1.

As to the fifth transistor M5, a first electrode is connected to the first transistor M1, and a second electrode is connected to the OLED. A gate electrode of the fifth transistor M5 is connected to the light emitting control line En. As such, the fifth transistor M5 is turned on when the light emitting control signal is not supplied and electrically connects the first transistor M1 to the OLED.

Fourth transistors (or leakage transistors) M4_1 and M4_2 are connected between the first node N1 and the initialization power source Vint in series. Here, the fourth transistors M4_1 and M4_2 are positioned on a current leakage path extending from the first node N1 to the initialization power source Vint, so that at least two transistors are connected in series. The fourth transistors M4_1 and M4_2 are turned on when the scan signal is supplied to the (n-1)th scan line Sn-1 and electrically connect the first node N1 to the initialization power source Vint. On the other hand, a common terminal of the serially connected fourth transistors M4_1 and M4_2 is connected to the second node N2, which is connected to the leakage current prevention unit 144.

The storage capacitor Cst is located between the first node N1 and the first power source ELVDD. The storage capacitor Cst stores a voltage corresponding to the data signal and the threshold voltage of the first transistor M1.

The boosting capacitor Cb is connected between the first node N1 and the n-th scan line Sn. The boosting capacitor Cb raises the voltage of the first node N1 after the storage capacitor Cst is charged with a voltage.

The leakage current prevention unit 144 minimizes or reduces the leakage current of the storage capacitor Cst. To this end, the leakage current prevention unit 144 includes a seventh transistor M7.

The seventh transistor M7 is connected between the second node N2 and the reference power source Vref, is turned off when the light emitting control signal (e.g., the light emitting control signal is a logic high signal) is supplied to the light emitting control line En, and is turned on when the light emitting control signal is not supplied. When the seventh transistor M7 is turned on, a voltage of the reference power source Vref is supplied to the second node N2, and the leakage current of the third transistors M3_1 and M3_2 and the fourth transistors M4_1 and M4_2 can be minimized or reduced.

Figure 3:
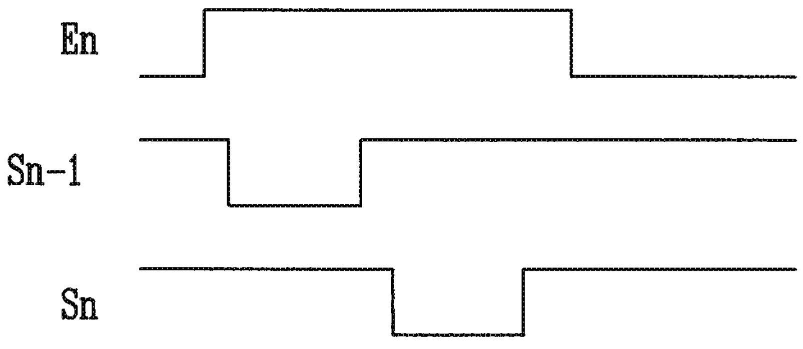
FIG. 3 is a waveform drawing illustrating a driving method of the pixel of FIG. 2.

FIG. 3 is a waveform drawing illustrating a driving method of the pixel of FIG. 2.

Referring to FIG. 3, first, the light emitting control signal is supplied to the light emitting control line En. When the light emitting control signal is supplied to the light emitting control line En, the sixth transistor M6, the fifth transistor M5 and the seventh transistor M7 are turned off.

After that, the scan signal is supplied to the (n-1)th scan line Sn-1. When the scan signal is supplied to the (n-1)th scan line Sn-1, the fourth transistors M4_1 and M4_2 are turned on. When the fourth transistors M4_1 and M4_2 are turned on, a voltage of the initialization power source Vint is supplied to the first node N1.

After the voltage of the initialization power source Vint is supplied to the first node N1, the scan signal is supplied to the n-th scan line Sn. When the scan signal is supplied to the n-th scan line Sn, the second transistor M2 and the third transistors M3_1 and M3_2 are turned on. When the second transistor M2 is turned on, the data signal is supplied from the data line Dm to the first electrode of the first transistor M1. Here, since the voltage of the first node N1 is initiated by the initialization power source Vint while the scan signal is supplied to the (n-1)th scan line Sn-1 (i.e., the voltage of the first node N1 is set to be lower than the voltage of the data signal), the first transistor M1 is turned on. When the first transistor M1 is turned on, the data signal is supplied to the first node N1 via the first transistor M1 and the third transistors M3_1 and M3_2. At this time, the storage capacitor Cst stores a voltage corresponding to the data signal and the threshold voltage of the first transistor M1.

After a voltage (e.g., predetermined voltage) is stored at the storage capacitor Cst, the supply of the scan signal to the n-th scan line Sn is stopped. At this time, the voltage of the scan line Sn raises from a low level voltage to a high level voltage, according to one embodiment. When the voltage of the scan line Sn is raised, the voltage of the first node N1, which is in a floating state, is raised by the boosting capacitor Cb, so that an image of a desired gray level may be displayed.

In more detail, the data signal supplied from the data driving unit 120 is supplied to the pixel 140 via the data line Dm. In this case, the data signal received at the pixel 140 has a voltage lower than a desired voltage due to a parasitic capacitor and resistance of the data line Dm. Therefore, according to one embodiment of the present invention, it is possible to realize a desired gray level by raising the voltage of the first node N1 by using the boosting capacitor Cb.

After raising the voltage of the first node N1, the supply of the light emitting control signal to the n-th light emitting control line En is stopped. At this time, a lower level voltage is supplied to the n-th light emitting control line En so that the sixth transistor M6, the fifth transistor M5, and the seventh transistor M7 are turned on.

When the sixth transistor M6 is turned on, the first electrode of the first transistor M1 and the first power source ELVDD are electrically connected. When the fifth transistor M5 is turned on, the second electrode of the first transistor M1 and the anode electrode of the OLED are connected. At this time, the first transistor M1 controls the amount of current flowing from the first power source ELVDD to the second power source ELVSS via the OLED in accordance with the voltage applied to the first node N1.

When the seventh transistor M7 is turned on, the reference power source Vref is supplied to the second node N2. Here, the second node N2 is connected to the common node of the third transistors M3_1 and M3_2 and the common node of the fourth transistors M4_1 and M4_2. Therefore, when the reference power source Vref is supplied to the second node N2, the first node N1 and the second node N2 are set to an almost same voltage. In this case, the leakage current flowing through the third transistors M3_1 and M3_2 and the fourth transistors M4_1 and M4_2 is minimized or reduced, and therefore an image of a desired brightness or gray level may be displayed. In other words, when voltages of the first node N1 and the second node N2 are set to a similar voltage, the leakage current is rarely generated at the first node N1 so that the voltage stored at the storage capacitor Cst can be stably maintained.

Here, the structure of the pixel 140 as described above illustrates an embodiment, and the present invention is not limited thereto. Actually, embodiments of the present invention can be applied to various pixels 140 having a leakage current path from the storage capacitor Cst.

Figure 4:
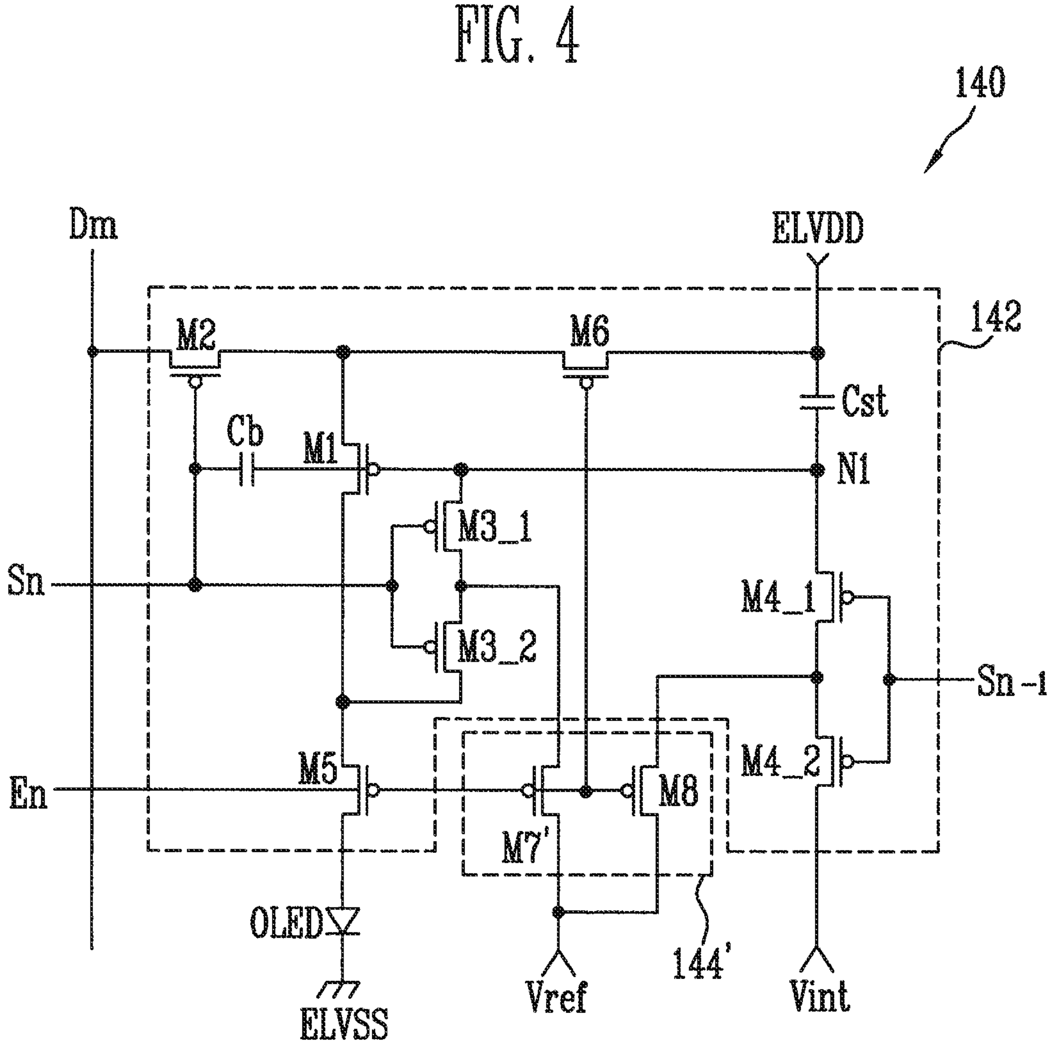
FIG. 4 is a circuit diagram illustrating a second embodiment of the pixel of FIG. 1.

FIG. 4 is a circuit diagram illustrating a second embodiment of the pixel of FIG. 1. In the description of FIG. 4, like elements as shown in FIG. 2 will be assigned with like reference numerals and their description will be omitted.

Referring to FIG. 4, a pixel 140 according to a second embodiment of the present invention includes an OLED, a pixel circuit 142 for controlling the amount of current to be supplied to the OLED, and a leakage current prevention unit 144' electrically connected to transistors formed on a path of the leakage current in order to minimize or reduce the leakage current.

The leakage current prevention unit 144' includes a seventh transistor M7' connected between the common node of the third transistors M3_1 and M3_2 and the reference power source Vref and an eighth transistor M8 connected between the common node of the fourth transistors M4_1 and M4_2 and the reference power source Vref.

The seventh transistor M7' is turned on when the light emitting control signal is not supplied to the light emitting control line En and supplies a voltage of the reference power source Vref to the common node of the third transistors M3_1 and M3_2. The eighth transistor M8 is turned on when the light emitting control signal is not supplied to the light emitting control line En and supplies a voltage of the reference power source Vref to the common node of the fourth transistors M4_1 and M4_2. The operation of the pixel 140 according to the second embodiment of the present invention is substantially identical to that of the first embodiment of the present invention as shown in FIG. 2 except for the two transistors included in the leakage current prevention unit 144'.

Figure 5:
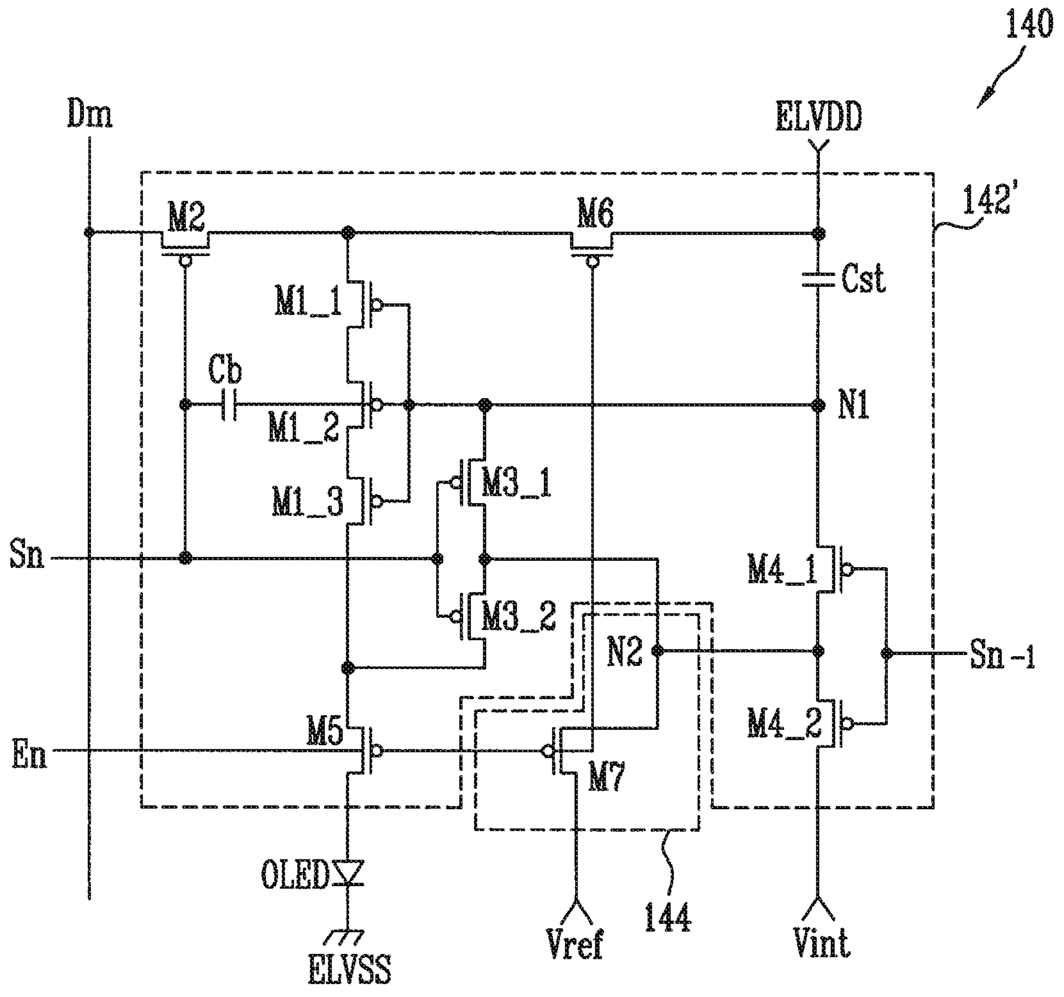
FIG. 5 is a circuit diagram illustrating a third embodiment of the pixel of FIG. 1.

FIG. 5 is a circuit diagram illustrating a third embodiment of the pixel of FIG. 1. In the description of FIG. 5, like elements as shown in FIG. 2 will be assigned with like reference numerals and their description will be omitted.

Referring to FIG. 5, a pixel 140 according to a third embodiment of the present invention includes an OLED, a pixel circuit 142' for controlling the amount of current supplied to the OLED, and a leakage current prevention unit 144 electrically connected to transistors formed on a path of the leakage current in order to minimize or reduce the leakage current of the pixel circuit 142'.

According to the third embodiment of the present invention, in the pixel circuit 142', a driving transistor includes a plurality of first transistors M1_1, M1_2, and M1_3. That is, the first transistors M1_1, M1_2, and M1_3 are connected in series between the second electrode of the second transistor M2 and the first electrode of the fifth transistor M5, and gate electrodes of the first transistors M1_1, M1_2, and M13 are connected to the first node N1. With three first transistors M1_1, M1_2, and M1_3, deviation of current (i.e., deviation by pixel) supplied to the OLED in response to the voltage applied to the first node N1 is minimized or reduced.

Figure 6:
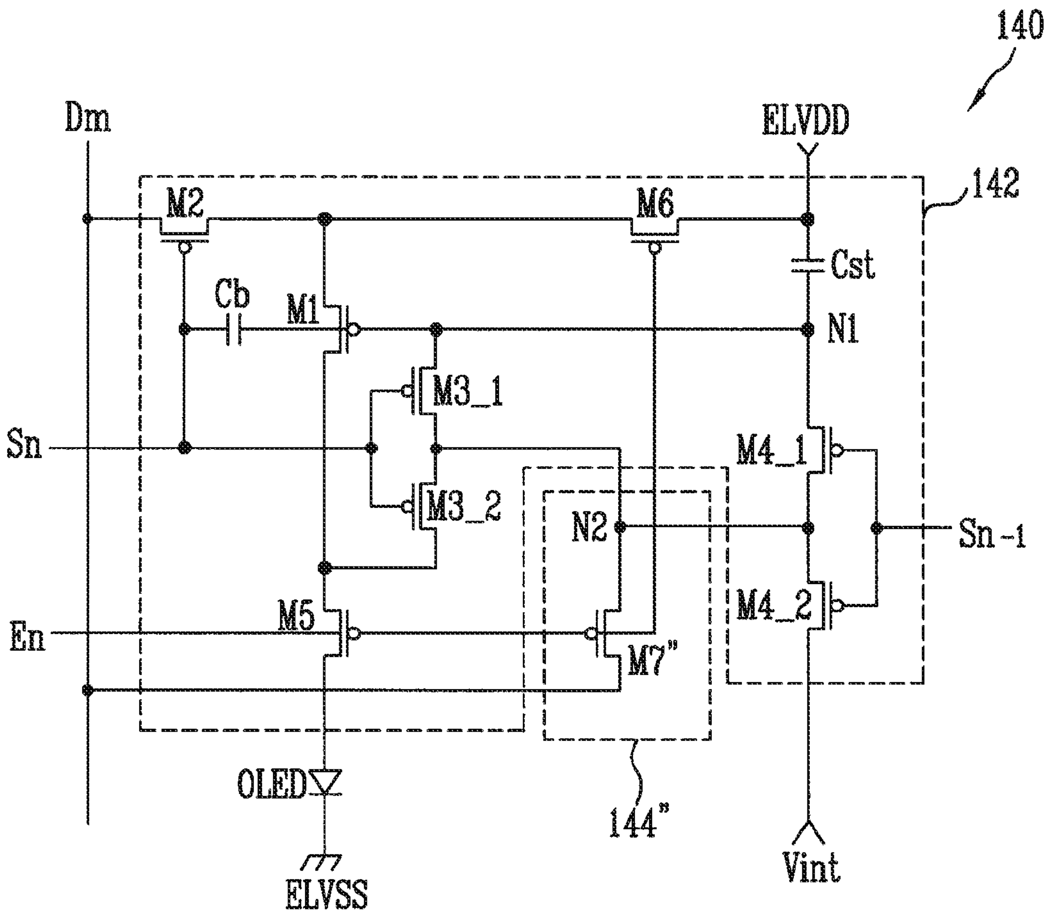
FIG. 6 is a circuit diagram illustrating a fourth embodiment of the pixel of FIG. 1.

FIG. 6 is a circuit diagram illustrating a fourth embodiment of the pixel of FIG. 1. In the description of FIG. 6, like elements as shown in FIG. 2 will be assigned with like reference numerals and their description will be omitted.

Referring to FIG. 6, a pixel 140 according to a fourth embodiment of the present invention includes an OLED, a pixel circuit 142 for controlling the amount of current supplied to the OLED, and a leakage current prevention unit 144" electrically connected to transistors formed on a path of the leakage current in order to minimize or reduce the leakage current.

The leakage current prevention unit 144" includes a seventh transistor M7" which is connected between the second node N2 and the data line Dm. The seventh transistor M7" is turned off when the light emitting control signal is supplied to the light emitting control line En, and is turned on when the light emitting control signal is not supplied. When the seventh transistor M7" is turned on, a voltage supplied to the data line Dm (i.e., a voltage of the data signal) is supplied to the second node N2.

At this time, the voltage of the data signal applied to the first node N1 for a previous period and the voltage of the data signal applied to the second node N2 are identical or slightly different from each other. However, the voltage difference between the first node N1 and the second node N2 is set within a range of the voltage of the data signal so that the leakage current from the first node N1 to the second node N2 can be minimized or reduced.

Although FIG. 6 illustrates a single transistor M7" formed in the leakage current prevention unit 144", the present invention is not limited thereto. For example, two transistors M7' and M8, as illustrated in FIG. 4, may be formed in the leakage current prevention unit 144". In this embodiment, the two transistors M7' and M8 are not connected to the reference power source Vref, but are connected to the data line Dm.

Figure 7:
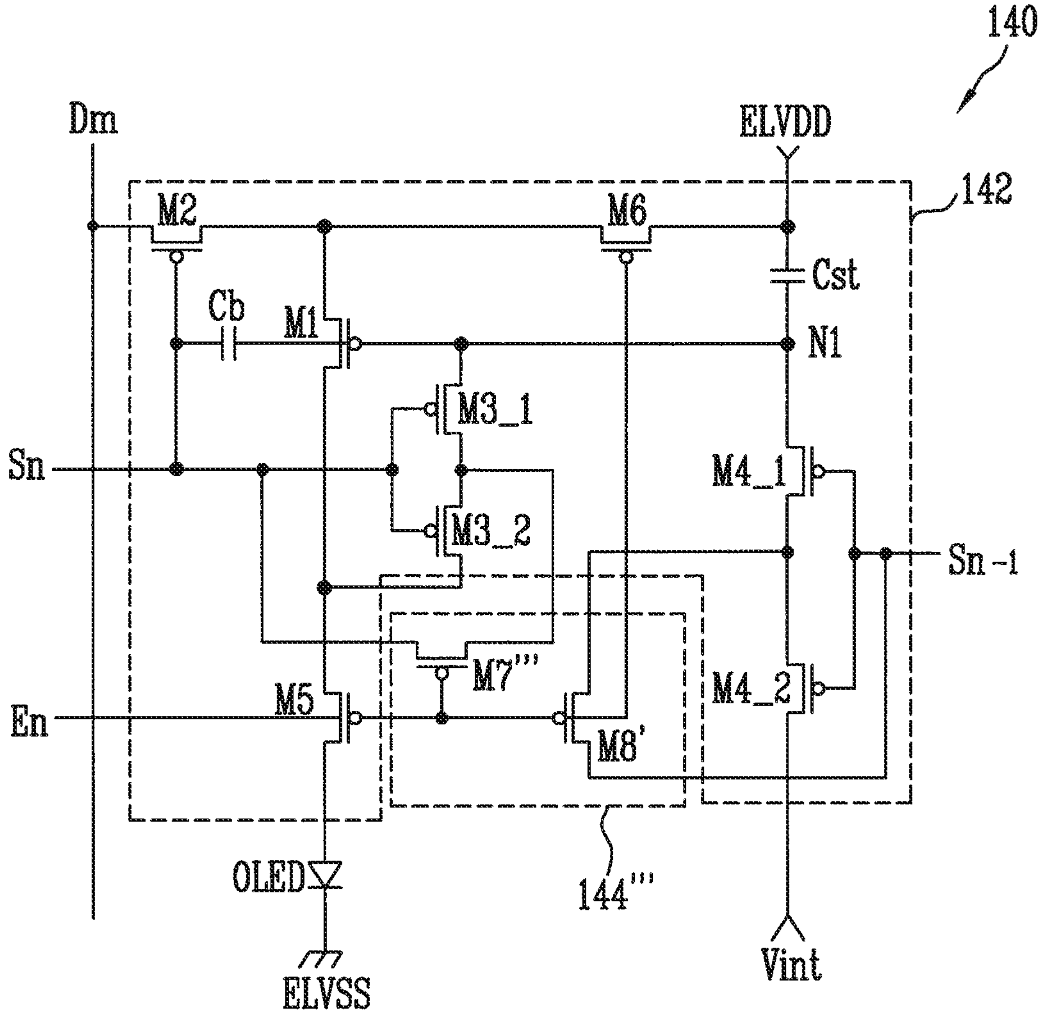
FIG. 7 is a circuit diagram illustrating a fifth embodiment of the pixel of FIG. 1.

FIG. 7 is a circuit diagram illustrating a fifth embodiment of the pixel of FIG. 1. In the description of FIG. 7, like elements as shown in FIG. 4 will be assigned with like reference numerals and their description will be omitted.

Referring to FIG. 7, a pixel 140 according to the fifth embodiment of the present invention includes an OLED, a pixel circuit 142 for controlling the amount of current supplied to the OLED, and a leakage current prevention unit 144'" electrically connected to transistors formed on a path of the leakage current in order to minimize or reduce the leakage current.

The leakage current prevention unit 144'" includes a seventh transistor M7'" connected between the common node of the third transistors M3_1 and M3_2 and the n-th scan line Sn, and an eighth transistor M8' connected between the common node of the fourth transistors M4_1 and M4_2 and the (n-1)th scan line Sn-1.

The seventh transistor M7'" is turned on when the light emitting control signal is not supplied (e.g., the light emitting control signal is a logic low signal) to the light emitting control line En and supplies the voltage supplied to the n-th scan line Sn to the common node of the third transistors M3_1 and M3_2. During the period when the light emitting control signal is not supplied to the n-th light emitting control line En, a high level voltage is supplied to the n-th scan line Sn. In general, the high level voltage is the same or similar voltage as the voltage of the data signal. The eighth transistor M8' is turned on when the light emitting control signal is not supplied to the light emitting control line En and supplies a high level voltage supplied to the (n-1)th scan line Sn to the common node of the fourth transistors M4_1 and M4_2. The pixel 140 according to the fifth embodiment of the present invention is substantially identical to the pixel of the second embodiment of the present invention as illustrated in FIG. 4, except for the connections of the seventh transistor M7'" and the eighth transistor M8' to the scan lines Sn-1 and Sn instead of the reference power source Vref.

Although FIG. 7 illustrates the seventh transistor M7'" and the eighth transistor M8' connected to different scan lines Sn-1 and Sn, the present invention is not limited thereto. For example, the seventh transistor M7'" and the eighth transistor M8' may be connected to the same scan line Sn-1 or Sn.

Figure 8:
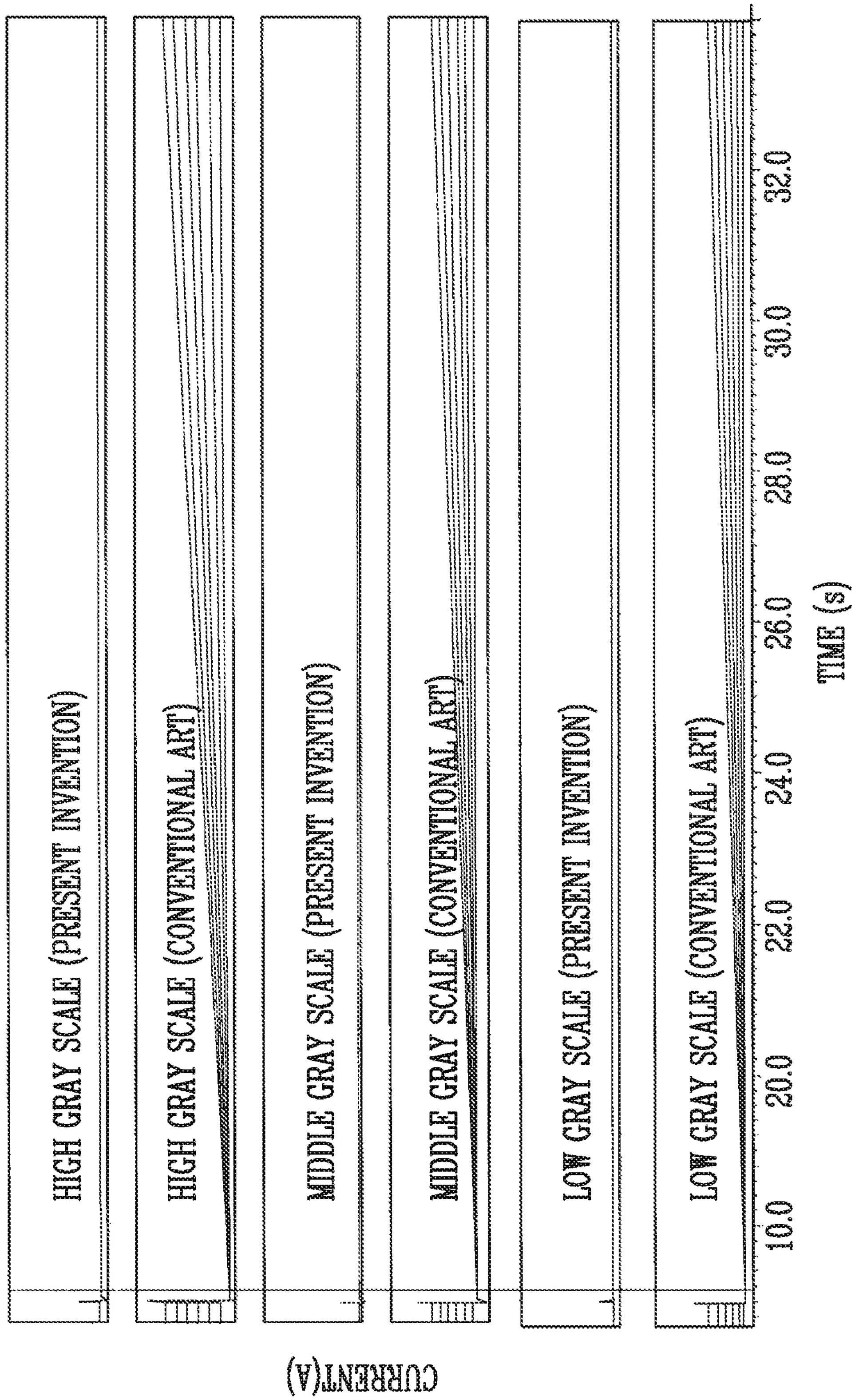
FIG. 8 is a drawing illustrating simulation results of a pixel according to an embodiment of the present invention.

FIG. 8 is a view illustrating simulation results of a pixel according to an embodiment of the present invention. FIG. 8 illustrates the comparison results of the pixel as shown in FIG. 4 with the conventional art in which the leakage current prevention unit 144' is not provided in the pixel as shown in FIG. 4.

Referring to FIG. 8, in a pixel of the conventional art, a leakage current is generated at a high gray level, a middle gray level, and a low gray level. However, the pixel 140 according to one embodiment of the present invention does not substantially generate a leakage current at the high gray level, the middle gray level, and the lower gray level. That is, the leakage current is rarely generated in the embodiment of the present invention, and therefore, an image of a desired brightness or gray level may be displayed.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A pixel comprising: an organic light emitting diode, a cathode electrode of the organic light emitting diode being directly connected to a second power source;
   - a first transistor for controlling an amount of current flowing from a first power source to the second power source via the organic light emitting diode;
   - a second transistor directly connected between a data line and a first electrode of the first transistor, the second transistor being configured to turn on when a scan signal is supplied to an i-th scan line;
   - a storage capacitor directly connected between the first power source and a gate electrode of the first transistor; a plurality of third transistors coupled between the gate electrode and a second electrode of the first transistor, the third transistors being configured to turn on when the scan signal is supplied to the i-th scan line;
   - a plurality of fourth transistors directly connected between the gate electrode of the first transistor and an initialization power source, the fourth transistors being configured to turn on when the scan signal is supplied to an (i-1)th scan line; and
   - a leakage current prevention unit for supplying a reference voltage to a first common terminal between the third transistors and to a second common terminal between the fourth transistors, wherein the first common terminal is directly connected to the second common terminal.

2. The pixel as claimed in claim 1, wherein the leakage current prevention unit is configured to supply the reference voltage for a period when the third transistors and the fourth transistors are turned on.

3. The pixel as claimed in claim 2, wherein the leakage current prevention unit comprises at least one transistor for supplying the reference voltage to the first common terminal and the second common terminal.

4. The pixel as claimed in claim 2, wherein the leakage current prevention unit comprises a fifth transistor connected between the first and second common terminals and a reference power source for supplying the reference voltage.

5. The pixel as claimed in claim 4, wherein the reference power source is configured to supply a voltage that is substantially the same as one of data signals supplied to the data line.

6. The pixel as claimed in claim 4, wherein the reference power source is configured to supply a voltage that is substantially the same as that of a data signal of a middle voltage among data signals.

7. The pixel as claimed in claim 1, further comprising:
   - a fifth transistor coupled between the second electrode of the first transistor and the organic light emitting diode, the fifth transistor configured to turn on at a time different from when the third transistors and the fourth transistors are turned on; and a sixth transistor coupled between the first electrode of the first transistor and the first power source, the sixth transistor being configured to turn on and off concurrently with the fifth transistor.

8. A pixel comprising:

an organic light emitting diode;

a driving transistor for controlling an amount of current flowing to the organic light emitting diode;

a storage capacitor directly connected to a gate electrode of the driving transistor;

a plurality of leakage transistors, at least two of the leakage transistors being directly connected in series between the gate electrode of the driving transistor and a first voltage source; and a leakage current prevention unit comprising a Leakage current prevention unit transistor for supplying a voltage of a second voltage source different from that of the first voltage source to a common terminal between respective source and drain electrodes of the at least two of the leakage transistors.

9. The pixel as claimed in claim 8, wherein the first voltage source comprises one of a second power source coupled to a cathode electrode of the organic light emitting diode or an initialization power source for initiating a voltage of a gate electrode of the driving transistor.

10. The pixel as claimed in claim 8, wherein the second voltage source is configured to supply a voltage higher than that of the first voltage source.

11. An organic light emitting display device comprising:

a scan driver for supplying a scan signal to scan lines and for supplying a light emitting control signal to light emitting control lines;

a data driver for supplying a data signal to data lines, a plurality of pixels positioned at crossings between the scan lines and the data lines;

a pixel of the pixels positioned at an i-th horizontal line, the pixel comprising:

an organic light emitting diode, a cathode electrode of the organic light emitting diode being directly connected to a second power source;

a first transistor for controlling an amount of current flowing from a first power source to the second power source via the organic light emitting diode a second transistor coupled between a data line of the data lines and a first electrode of the first transistor, the second transistor being configured to turn on when the scan signal is supplied to an i-th scan line of the scan lines;

a storage capacitor directly connected between the first power source and a gate electrode of the first transistor;

a plurality of third transistors coupled between the gate electrode and a second electrode of the first transistor, the third transistors being configured to turn on when the scan signal is supplied to the i-th scan line;

a plurality of fourth transistors coupled between the gate electrode of the first transistor and an initialization power source, the fourth transistors being configured to turn on when the scan signal is supplied to an (i-1)th scan line of the scan lines; and a leakage current prevention unit for supplying a reference voltage to a first common terminal between the third transistors and to a second common terminal between the fourth transistors wherein the first common terminal is directly connected to the second common terminal.

12. The organic light emitting display device as claimed in claim 11, wherein the leakage current prevention unit is configured to supply the reference voltage during a period excluding a period when the light emitting control signal is supplied to an i-th light emitting control line of the light emitting control lines.

13. The organic light emitting display device as claimed in claim 12, wherein the scan driving unit is configured to supply the light emitting control signal to the i-th light emitting control line to be overlapped with scan signals supplied to the (i-1)th scan line and the i-th scan line, respectively.

14. The organic light emitting display device as claimed in claim 12, wherein the leakage current prevention unit comprises at least one transistor for supplying the reference voltage to the first common terminal and the second common terminal.

15. The organic light emitting display device as claimed in claim 14, wherein the reference voltage is higher than a voltage of the initialization power source.

16. The organic light emitting display device as claimed in claim 14, wherein the reference voltage is substantially the same as that of a data signal of a middle voltage among data signals.

* * * * *